United States Patent
Korb et al.

(10) Patent No.: US 7,379,418 B2
(45) Date of Patent: May 27, 2008

(54) METHOD FOR ENSURING SYSTEM SERIALIZATION (QUIESCE) IN A MULTI-PROCESSOR ENVIRONMENT

(75) Inventors: Steven A. Korb, Red Hook, NY (US); Pak-kin Mak, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1349 days.

(21) Appl. No.: 10/436,320

(22) Filed: May 12, 2003

(65) Prior Publication Data

US 2004/0228359 A1    Nov. 18, 2004

(51) Int. Cl.
*H04J 1/16* (2006.01)
*G01R 31/08* (2006.01)
*G01R 31/28* (2006.01)
*G06F 11/00* (2006.01)
*G06F 3/00* (2006.01)
*H04L 12/28* (2006.01)
*H04L 12/56* (2006.01)
*H04N 7/12* (2006.01)

(52) U.S. Cl. ............ 370/216; 370/221; 370/242; 370/248; 370/254; 370/406; 370/431; 710/44; 710/46; 710/47; 710/48; 710/59; 710/260; 710/261; 710/264; 712/11; 712/15; 712/32; 712/34

(58) Field of Classification Search ........... 370/406, 370/216, 248, 254, 431
See application file for complete search history.

(56) References Cited

U.S. PATENT DOCUMENTS

| | | | | |
|---|---|---|---|---|
| 4,803,485 A | * | 2/1989 | Rypinski | 370/452 |
| 5,535,192 A | * | 7/1996 | Trubey et al. | 370/223 |
| 5,991,891 A | * | 11/1999 | Hahn et al. | 714/4 |
| 6,070,207 A | * | 5/2000 | Bell | 710/302 |
| 6,108,699 A | * | 8/2000 | Moiin | 709/221 |
| 6,421,710 B1 | * | 7/2002 | Jasperneite et al. | 709/208 |
| 6,633,538 B1 | * | 10/2003 | Tanaka et al. | 370/222 |
| 6,766,482 B1 | * | 7/2004 | Yip et al. | 714/717 |

(Continued)

FOREIGN PATENT DOCUMENTS

JP    1982-194651    * 11/1982

(Continued)

*Primary Examiner*—Seena S. Rao
*Assistant Examiner*—Xavier Wong
(74) *Attorney, Agent, or Firm*—Lynn L. Augspurger

(57) ABSTRACT

A method of ensuring system serialization in a multiprocessor multi-nodal environment is used to force all processors in a multiprocessor environment to temporarily suspend operations while one processor changes the system state. Architected designs where latencies between nodes are made known and predictable greatly simplify the task of coordinating quiesce responses within the system. When latencies are not fixed and topologies such as open or closed bus architectures are be used a more dynamic approach is required to ensure system serialization. Adaptive quiesce logic on each node's SCE can dynamically identify the role of the node within the system and automatically configure itself to guarantee that no enabled processor within the entire system receives a quiesce indication before all processors have reached the stopped state. This is also true for systems where nodes are being concurrently added or removed during system operation. Bus states process quiesce requests. Also this method of reaching a quiesced state operates independently of differing latencies between nodes. Defined master slave end and interior nodes are used within the quiesce network.

18 Claims, 4 Drawing Sheets

Multi Node Open Ring Quiesce Network

U.S. PATENT DOCUMENTS

| | | | |
|---|---|---|---|
| 7,126,910 B1 * | 10/2006 | Sridhar | 370/229 |
| 7,274,674 B2 * | 9/2007 | Brewer et al. | 370/258 |
| 2002/0075870 A1 * | 6/2002 | de Azevedo et al. | 370/390 |
| 2002/0083243 A1 * | 6/2002 | Van Huben et al. | 710/107 |
| 2002/0110155 A1 * | 8/2002 | Pearce et al. | 370/519 |
| 2002/0186711 A1 * | 12/2002 | Masuyama et al. | 370/468 |
| 2004/0059852 A1 * | 3/2004 | Sun et al. | 710/110 |
| 2004/0109633 A1 * | 6/2004 | Pittman et al. | 385/16 |
| 2004/0216003 A1 * | 10/2004 | Floyd et al. | 714/25 |

FOREIGN PATENT DOCUMENTS

| | | | |
|---|---|---|---|
| JP | 63046029 A | * | 2/1988 |
| JP | 1994-164603 | * | 6/1994 |

* cited by examiner

Bi-Nodal System Structure

Multi Node Open Ring Quiesce Network

METHOD FOR ENSURING SYSTEM SERIALIZATION (QUIESCE) IN A MULTI-PROCESSOR ENVIRONMENT

FIELD OF THE INVENTION

This invention relates to a multiprocessor computer system having a plurality of processing nodes with each processing node being coupled to a plurality of bus devices and particularly to one which provides local and remote state information to decide when to send quiesce indication out beyond an originator's node.

Trademarks: IBM® is a registered trademark of International Business Machines Corporation Armonk New York U.S.A. Other names may be registered trademarks or product names of International Business Machines Corporation or other companies.

BACKGROUND

Processor improvements which became used in the IBM zArchitecture were described in U.S. Pat. No. 6,079,013 for "MULTIPROCESSOR SERIALIZATION WITH EARLY RELEASE OF PROCESSORS" by P. K. Mak et al issued Jun. 20, 2000. In a multiprocessor multi-nodal system like the IBM z900 machines a method to ensure system serialization (a system quiesce state) is needed to force all processors in the multiprocessor environment to temporarily suspend operations while one processor changes the system state. In a multiprocessor environment only one Processing Unit (PU) can change the system state at a time requiring all PU activity to be stopped beforehand. PU external Control Commands used by processors to signal one another are sent to request that PU's in the system suspend operations. The System Control Element (SCE) Quiesce network coordinates responses from all enabled processors across all configured nodes in the system and responds back to all enabled processing units (PU) that the system is stopped.

SUMMARY OF THE INVENTION

With this invention SMP (Symmetrical Multi-Processors) multi-nodal systems implement a method and apparatus for achieving system serialization or Quiesce while accounting for various nodal interconnections. In a SMP multi-nodal system each processing node can be configured to support various topologies such as single node or multi-node Multi-nodal systems can be connected using a ring topology and can, depending on the desired configuration, be either be open ring or closed ring. To achieve quiesce in this dynamic environment the method includes the steps of:

Determining the inter nodal configuration state and the role of each node in the SCE (System Control Element) quiesce network.
  This includes the concept of "master" and "slave" nodes.
Collecting PU Quiesce responses from locally enabled processors.
Accumulate responses as dictated by dynamically changing ring topology configuration.
  This includes an adaptive quiesce network while concurrently adding or removing a node during system operation.
Respond back to local PU's within each node once all PU's in entire system have quiesced.

Thus in the method which may be used with open and closed topologies, in a multi-processor multi-nodal system the basic steps of serializing requests to ensure system quiesce, includes:
 a. dynamically identifying the role of each node within the system based on bus inter-connectivity;
 b. accumulating local processor responses and propagating the a quiesce signal indicator to adjacent nodes as directed by role in system;
 c. informing local processors of system quiesce upon receipt of all remote quiesce indicators.

This method of ensuring system serialization in a multi-processor multi-nodal environment is used to force all processors in a multiprocessor environment to temporarily suspend operations while one processor changes the system state. Architected designs where latencies between nodes are made known and predictable greatly simplify the task of coordinating quiesce responses within the system. When latencies are not fixed and topologies such as open or closed bus architectures are used a more dynamic approach is required to ensure system serialization. Adaptive quiesce logic on each node's SCE can dynamically identify the role of the node within the system and automatically configure itself to guarantee that no enabled processor within the entire system receives a quiesce indication before all processors have reached the stopped state. This is also true for systems where nodes are being concurrently added or removed during system operation. In the system bus states process quiesce requests. Also this method of reaching a quiesced state operates independently of differing latencies between nodes. Defined master slave end and interior nodes are used within the quiesce network.

These and other improvements are set forth in the following detailed description. For a better understanding of the invention with advantages and features refer to the description and to the drawings.

DESCRIPTION OF THE DRAWINGS

FIG. 1 illustrates prior art quiesce network in a bi-nodal architecture with a dedicated closed ring interconnection method; while FIG. 2 illustrates a multi-node SCE quiesce network synchronizing a plurality of processing units across the various nodes to indicate a quiescent state using a closed ring bus architecture; while FIG. 3 illustrates a multi-node SCE quiesce network using an open ring bus architecture; while

Our detailed description explains the preferred embodiments of our invention together with advantages and features by way of example with reference to the drawings.

DETAILED DESCRIPTION OF THE INVENTION

Figure 1:
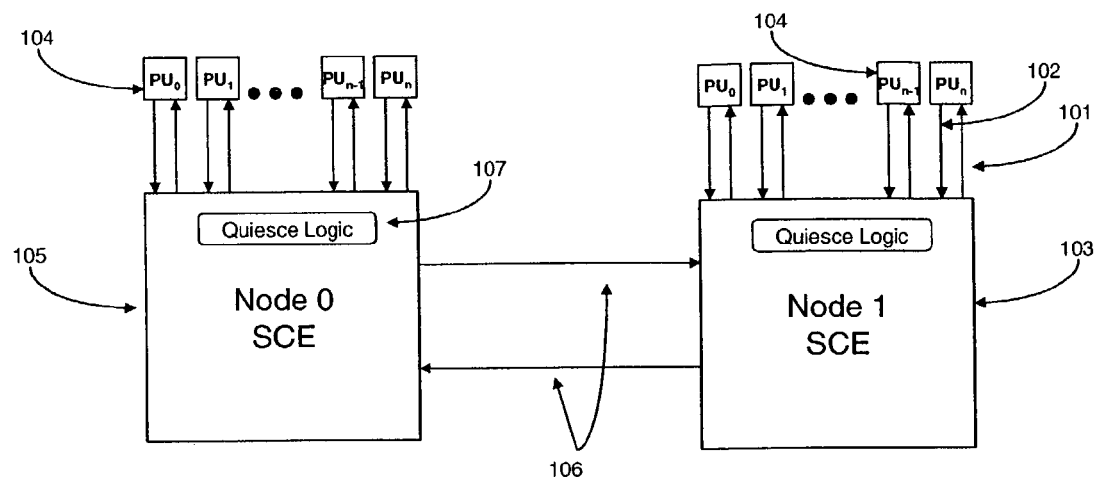

Turning to FIG. 1 notice that the prior art quiesce network depicts a maximum bi-nodal design point with node zero 105 and node one 103 which are connected using dedicated ring busses in each direction 106. Each node has a plurality of local processing units 104 which send central processing unit (CP) external control command (quiesce) responses to the respective node's SCE quiesce network 102 and receive quiesce indications from the SCE quiesce network on dedicated response lines 101 after being processed by the SCE quiesce response logic 107 which coordinates all local and remote responses before replying back to local processors on each of the respective nodes to ensure a system quiesce state.

In addition FIG. 1 shows a maximum of up to two nodes 103 & 105, each having a plurality of processors 104. This architected configuration and packaging constraint provides a fixed latency between the nodes on the dedicated rings 106 allowing the quiesce logic within the SCE 107 to predict the latency between the nodes and the resultant response to the local processors. This fixed latency between nodes simplifies the SCE quiesce network. This is considered prior art.

Figure 2:
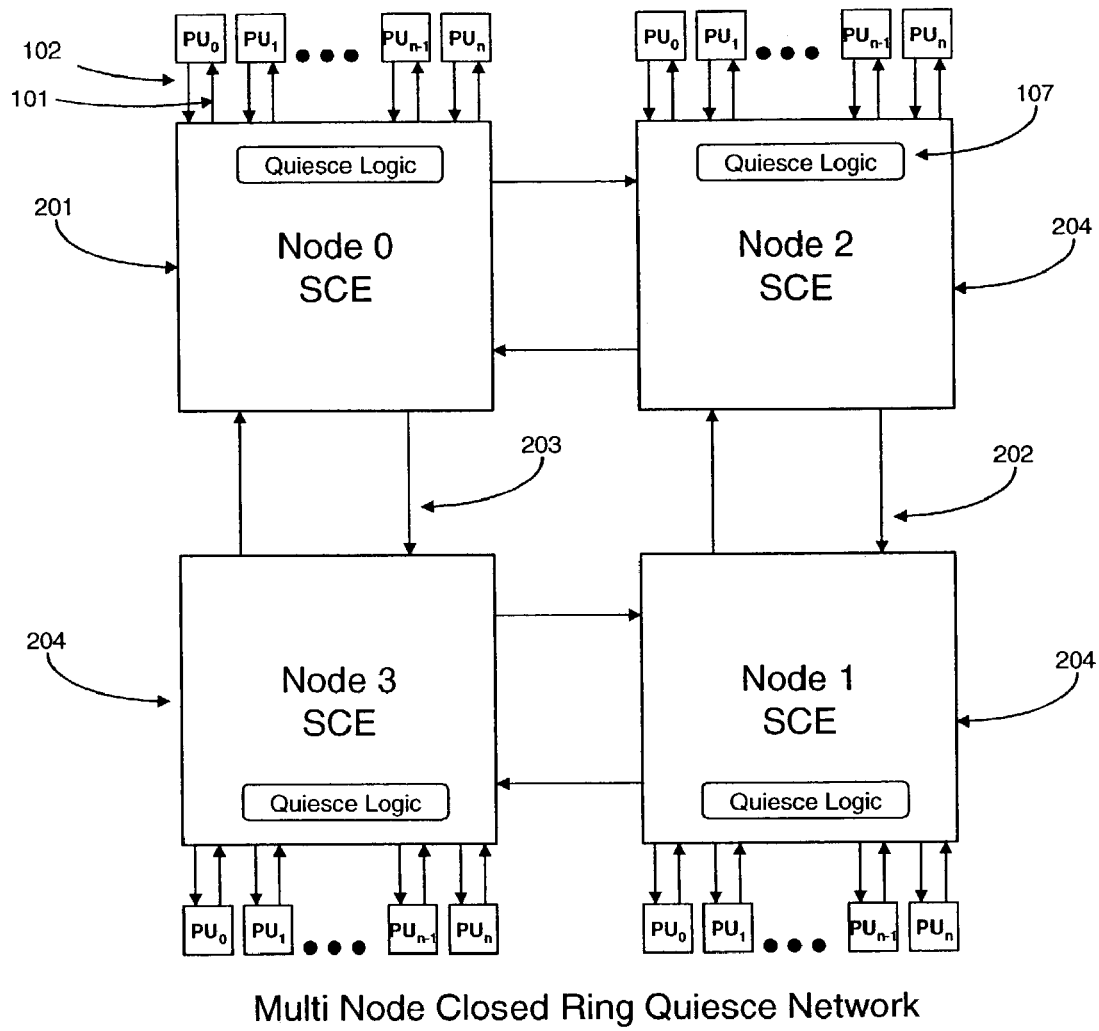

Referring to FIG. 2 there is illustrated an increase in maximum number of nodes within the system as a departure from previous art. It is the role of the SCE quiesce logic within each node to determine it's role in the overall quiesce network. Node interconnection interfaces can be dynamically configured in such a way as to add or remove nodes even while the system is running. The SCE quiesce logic continually and dynamically evaluates the system configuration and adapts to changes accordingly.

To make the SCE quiesce network function correctly in a closed ring interconnection topology this embodiment defines the concept of a master quiesce node 201 with any number of additional slave nodes 204. The master SCE node 201 is defined as being the lowest numbered node configured in the system. This is node zero as shown in FIG. 2. The master quiesce node prevents a system quiesce "deadlock" by initiating the quiesce sequence around the ring bus topology 202 & 203. This initial quiesce signal is sent upon receiving a quiesce indication from all local processors only and is sent out in each ring bus direction to the adjacent slave node(s).

The behavior in the receiving slave node(s) 204 varies from the master since a receiving slave node(s) collects both the local processor quiesce reponses 102 in addition to the incoming ring responses for each ring bus before propagating the quiesce signal onto the respective ring. For example in FIG. 2 when node 0 receives responses from all local processors it will begin by sending a quiesce signal in both ring directions 202 & 203. The quiesce logic in node 2 will not forward that indication on ring interface 202 until it has received responses from all of the locally enabled processors within node 2. This process will repeat until all nodes have signaled to each of the others nodes through the quiesce network back to the originating node. Only once the quiesce logic on each node 107 has received quiesce indications from all enabled local processors and both ring interfaces does a quiesce broadcast response go back to all locally enabled processors thus indicating a system quiesce or stopped state.

Figure 3:
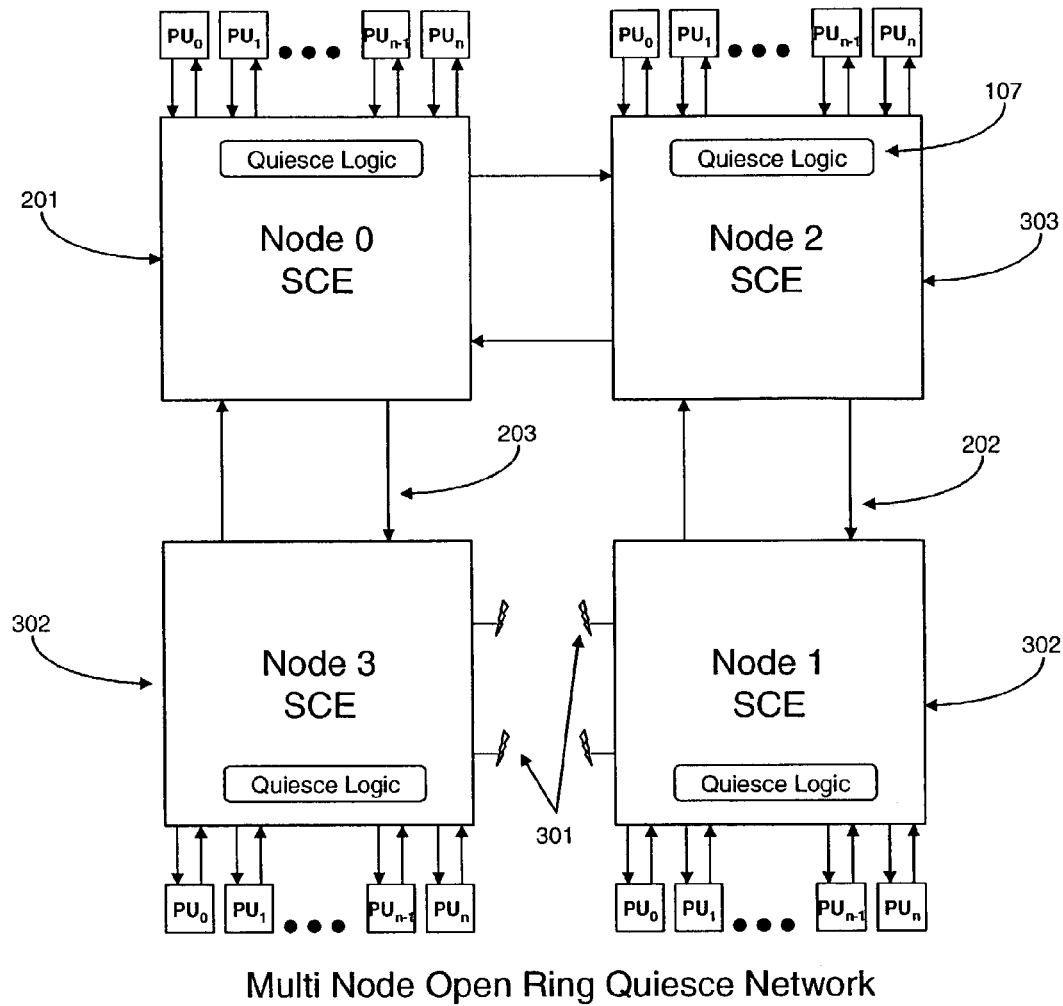

Turning to FIG. 3 notice that the ring interface between nodes 1 and 3 has been eliminated as marked at 301. The absence of this direct connectivity changes the behavior of each of the nodes within the system. In open ring topologies we maintain the concept of a master SCE node 201 and introduce the concept of end nodes 302 and interior nodes 201 & 303. Notice that in open ring the master SCE node is also an interior node. In open ring topologies the end node(s) 302 behave like master SCE nodes in a closed ring configuration. Specifically end nodes only accumulate responses from all locally enabled processors before propagating the quiesce signal onto the available ring interface. Although node zero remains the master SCE node within the system (lowest numbered node) it must behave exactly as a slave node does within a closed ring system. In particular upon receiving a quiesce indication from all locally enabled processors node 0 must include a quiesce indication on clockwise ring interface 202 before propagating the signal along the respective ring interface to interior node 2.

Figure 4:
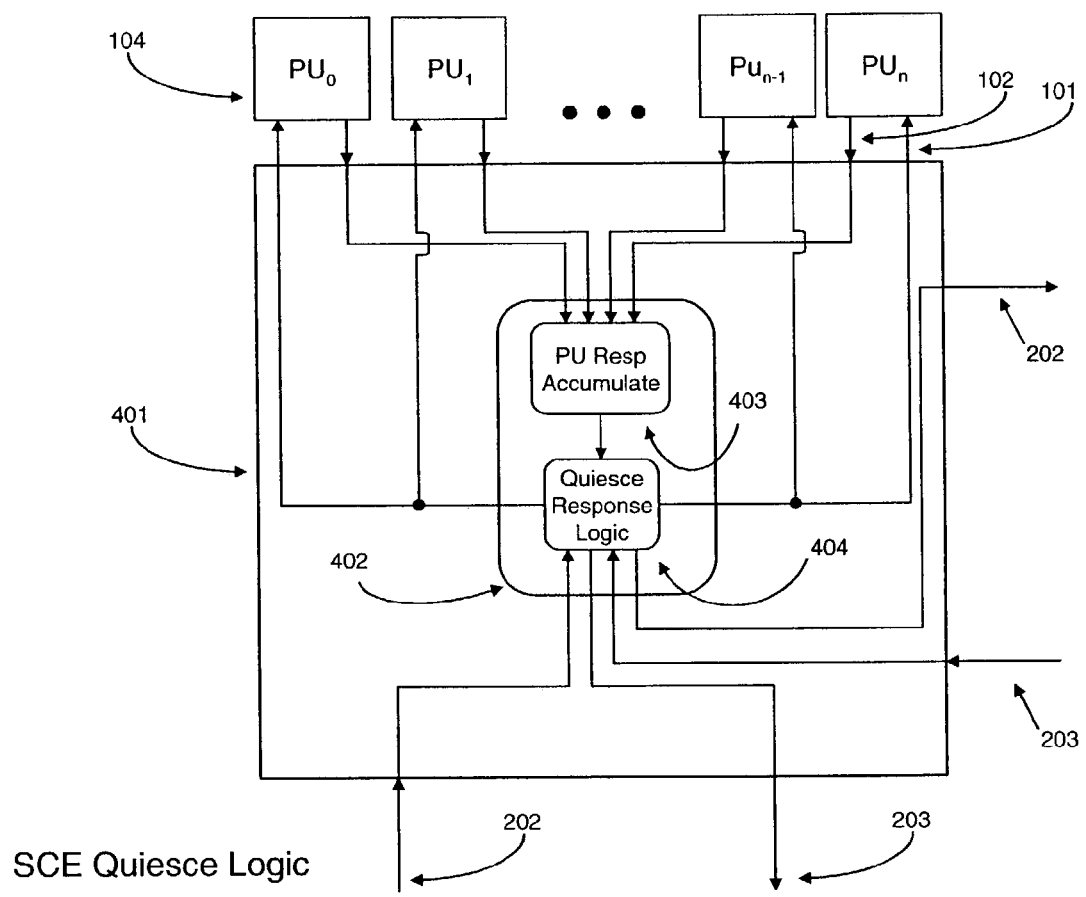
FIG. 4 illustrates a more detailed view of the SCE quiesce logic with each enabled node within the system. These nodes have at minimum a dual ring topology for nodal interconnection and dynamically adapt their role in the SCE quiesce network as the interconnection topology changes (such as concurrent node add or system maintenance).

Turning to FIG. 4 we see a more detailed depiction of the quiesce logic within an SCE node. The processor response accumulator 403 tracks and signals that all locally enabled processors within the node have responded to the external quiesce request. Once this condition has been satisfied it then forwards this to the quiesce response logic 404 which then determines if a local response is required based on the role of the node within the system and incoming ring responses. This quiesce response logic 404 (part of encapsulation 402) is responsible for propagating ring responses to adjacent nodes as well as responding to locally enabled processors when appropriate.

While the preferred embodiment to the invention has been described it will be understood that those skilled in the art both now and in the future may make various improvements and enhancements which fall within the scope of the claims which follow. These claims should be construed to maintain the proper protection for the invention first described.

What is claimed is:

1. A method for use in multiprocessor multi-nodal system of serializing requests to ensure system quiesce, comprising the steps of:
   concurrently adding or removing a node using local processor nodes of a local ring topology having adaptive logic for responses during system operation and each node of said local ring topology being only aware of up to two adjacent nodes on said local ring while:
   a. causing enabled local processor adaptive quiesce logic on a node's system topology network interface to dynamically respond and identify the role of it's node by identification of a node within the overall multi-processor multi-nodal system based on bus inter-connectivity;
   b. accumulating responses from the local processors, and propagating a quiesce signal indicator from said node's system topology network interface to adjacent nodes as directed by said role of it's node within the overall multi-processor multi-nodal system;
   c. informing the local processors of system quiesce upon receipt of all remote quiesce indicators.

2. The method according to claim 1 wherein inter nodal interfaces in said multi-nodal system are enabled or disabled while maintaining in the system the ability to assure system quiesce while concurrently adding or removing a node during system operation within said ring topology having a distributed system interconnected among the nodes.

3. The method according to claim 1 wherein said multi-nodal system includes at least one closed system and within the multi-nodal system a master node of said local ring within said multi-nodal system is identified to propagate quiesce indications to adjacent nodes by gathering only responses from the local processors to avoid "quiesce deadlock" within closed systems.

4. The method according to claim 1 wherein said multi-nodal system includes at least one bus closed system and within the multi-nodal system slave nodes in closed bus systems between nodes of said multi-nodal system respond to local and incoming quiesce indications from adjacent nodes before propagating to other adjacent nodes on same bus interface.

5. The method according to claim 1 wherein said multi-nodal system includes at least one bus closed system and within the multi-nodal system end nodes in open bus topologies between nodes of said local ring behave like master nodes within closed bus systems where the master node is the lowest numbered node configured for each system configuration.

6. The method according to claim 1 wherein said multi-nodal system includes at least one bus closed system and within the multi-nodal system interior nodes in open bus systems behave like slave nodes in closed bus systems.

7. The method according to claim 1, wherein the steps of ensuring system serialization in a multiprocessor multi-nodal environment is used to force all processors in a multiprocessor environment to temporarily suspend operations while one processor changes the system state.

8. The method according to claim 1, wherein bus interconnectivity latencies between nodes of said local ring are not fixed and topologies such as open or closed bus architectures are used, and said adaptive quiesce logic on each node's system topology network interface dynamically identify the role of the node within the system and automatically configures itself to guarantee that no enabled processor within the entire system receives a quiesce indication before all processors have reached the stopped state.

9. The method according to claim 1, wherein defined master slave end and interior nodes are used within a quiesce network using said steps for serializing requests to ensure system quiesce.

10. The method according to claim 1, wherein bus states process quiesce requests in the system.

11. The method according to claim 1, wherein all processors in said multiprocessor multi-nodal system temporarily suspend operations while one local processor changes the system state.

12. The method according to claim 11, wherein the adaptive quiesce logic on each node's system topology network interface dynamically identifies the role of it's node within the multiprocessor multi-nodal system within said ring topology having a distributed system interconnected among the nodes based on bus inter-connectivity and automatically configures itself to guarantee that no enabled processor within the entire system receives a quiesce indication before all processors have reached a stopped state whether or not the nodes are being concurrently added or removed during system operation.

13. The method according to claim 12, wherein the serialization of requests for reaching a quiesced state operates independently of differing latencies between nodes.

14. The method according to claim 13, wherein propagating said quiesce signal indicator to adjacent nodes as directed by the role of it's node within the system is repeated until all nodes have signaled to each of the other nodes through the multiprocessor multi-nodal system back to the originating nodes, and only once the adaptive quiesce logic on each node has received a quiesce indication from all enabled local processors and interfaces does a quiesce broadcast response go back to said enabled local processors to indicate a system quiesce.

15. The method according to claim 14, wherein in open ring topologies end nodes only accumulate responses from enabled local processors before propagating a quiesce signal onto an available ring interface.

16. The method according to claim 15, wherein the adaptive quiesce logic and a local processor accumulator tracks and responds with a signal when all enabled local processors have responded to an external quiesce request, and then forwards this request to quiesce response logic responsible for propagating ring responses to adjacent nodes as well as responding to enabled local processors when appropriate.

17. The method according to claim 16, wherein said multi-nodal system includes at least one closed system and within the multi-nodal system a master node within said ring topology having a distributed system interconnected among the nodes and within said multi-nodal system is identified to propagate quiesce indications during a system level quiesce operation to adjacent nodes by gathering only local processor responses to avoid "quiesce deadlock" within closed systems.

18. The method according to claim 16 wherein said multi-nodal system includes at least one bus closed system and within the multi-nodal system end nodes in open bus topologies between nodes of said local ring behave like master nodes within closed bus systems where the master node is the lowest numbered node configured for each system configuration to differentiate said master node which initiated a quiesce operation from the nodes which must honor the guiesce operation.

* * * * *